Oct. 13, 1942.  G. ALVARI  2,298,730
INDICATING SLIDE DEVICE
Filed March 1, 1939
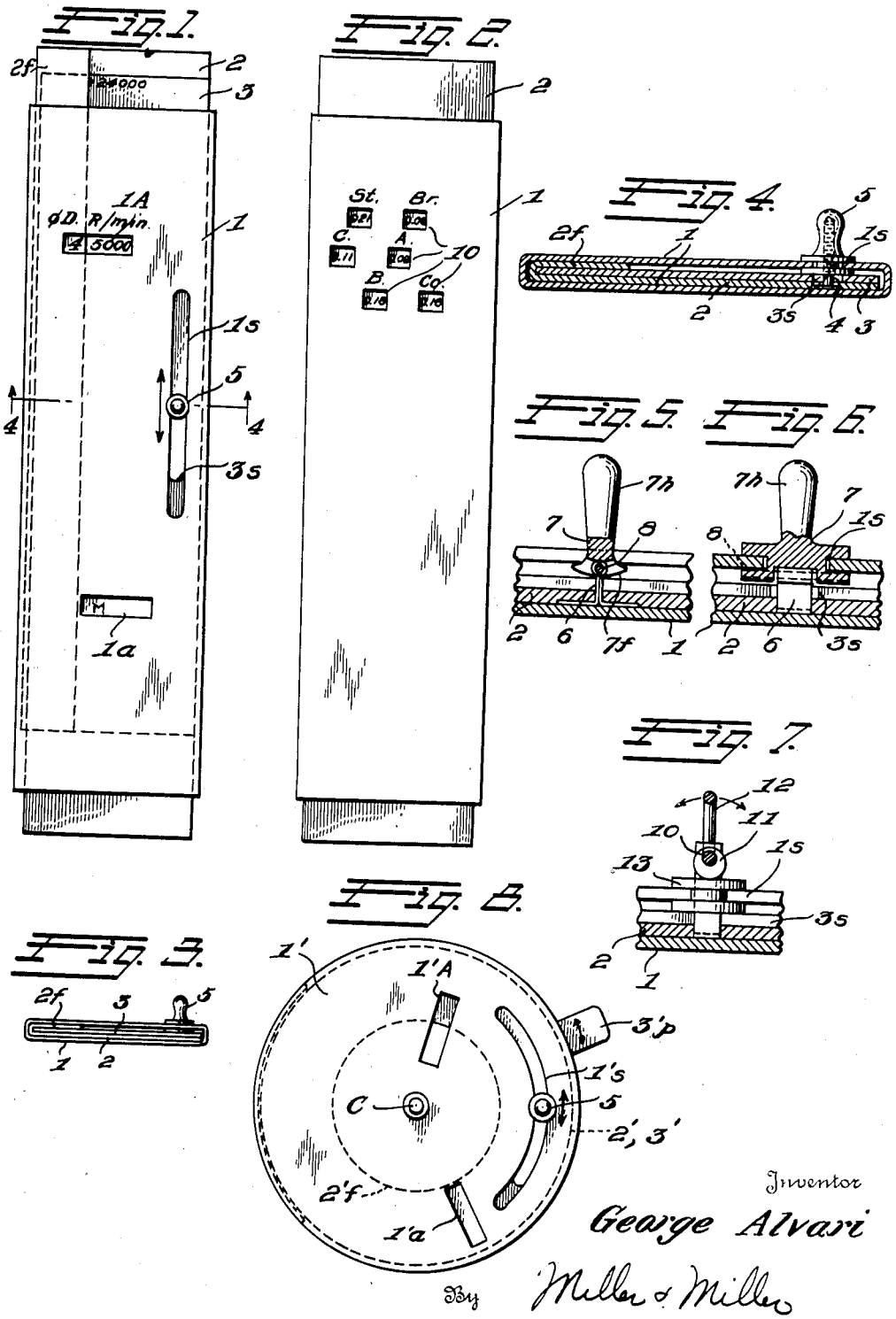
Inventor
George Alvari
By Miller & Miller
Attorneys Patented Oct. 13, 1942

2,298,730

UNITED STATES PATENT OFFICE 2,298,730

INDICATING SLIDE DEVICE

George Alvari, Brooklyn, N. Y.

Application March 1, 1939, Serial No. 259,299

1 Claim. (Cl. 235—89)

My invention relates to improvements in indicating devices of the type comprising two or more slides lodged in an enveloping body.

In known devices of this kind each of the slides could only be individually set or in certain instances one of the two slides, when reaching a predetermined position with relation to the other slide, was carried on by the latter by means of a stop or driver. Consequently, the indicating result could only be found for a relatively restricted number of conditions, as determined by the positive cooperation of the two slides.

This drawback is obviated, according to my invention, by the fact that the different slides are arranged in a manner so as to permit a setting of either slide individually or of both slides simultaneously, means being provided by which the slides may be united together to attain a common setting of the slides in any relation. A device of this kind may be used for a great number of mathematical and technical indications of all kinds, for tables, time tables, railway schedules and the like.

The device may be constructed of any appropriate material such as cardboard, sheet metal, cellulosic xanthogenate and may be of different shapes, for example, rectangular with longitudinally sliding slides or of a circular shape with rotating slides.

Preferably, the uniting means constitutes a screw bolt secured to the under slide and on which is screwed a nut shaped as a setting knob protruding on the upper side of the body of the device.

However, there may also be employed a jamming device embodying a pivoted eccentric pressure lever uniting the slides whereby the latter may be operated in unison.

Other objects and features of my invention will be set out in the following description when taken in conjunction with the appended drawing showing embodiments of the invention and in which Fig. 1 is a plan view of the upper side of an indicating slide device.

Fig. 2 is a plan view of the under side of the indicating slide device of Fig. 1.

Fig. 3 is an end view of the slide device shown in Figs. 1 and 2.

Fig. 4 is a sectional view on a larger scale taken on line 4—4 of Fig. 1.

Fig. 5 is a sectional view of a modified form of the slide uniting means.

Fig. 6 is also a sectional view of the uniting means of Fig. 5 taken in a plane at right angles to the latter.

Fig. 7 is a view similar to Fig. 5 but of a modified form of the slide uniting means.

Fig. 8 is a plan view of a modified form of the indicating slide device employing rotating slides.

Referring first to the structure shown in Figs. 1 to 4 inclusive of the drawing, the reference numeral 1 designates the enveloping body of the slide device in the shape of a rectangular sheath of thin cardboard open at the opposite ends thereof. The device comprises two superimposed slides lodged in the sheath 1 so as to perform, when displaced, a longitudinal sliding movement and includes an under slide 2 and an upper slide 3, preferably also formed of cardboard. At its left margin the under slide 2 is provided with a flap 2f folded upon the upper slide 3 so as to partially cover the latter. The sheath 1 has an aperture 1A in its upper face adjacent the top edge thereof and a similar aperture 1a adjacent the bottom edge, both apertures extending transversely of the sheath 1. The latter is provided with a longitudinal slot 1s adjacent its right hand edge intermediate the apertures 1A and 1a. The upper slide 3 has a slot 3s of equal length and co-extensive with the slot 1s.

The means for uniting the two slides, when desired, is constructed as follows. A screw bolt 4 is secured to the under slide 2, see Fig. 4, said bolt traversing the two superimposed slots 1s and 3s of the sheath 1 and the slide 3, respectively. A threaded nut 5 in the shape of a setting knob threadedly engages screw bolt 4. The setting knob 5 has a circular groove into which the two margins of the slot 1s of the sheath 1 protrude, and in this manner the setting knob is guided in the slot 1s, and at the same time the loss of the knob is prevented in the event that it should become unscrewed from the bolt 4.

The sheath 1 has a number of apertures 10 on its under face. In the drawing, the indicating device is shown as referring to the drillings of bores in various materials. In this case, the diameters of the drills are indicated on the flap 2f so as to be visible through the aperture 1A. The number of revolutions per minute of the drilling spindle is indicated on the upper slide 3 adjacent the inner edge of the flap 2f and may be seen through the aperture 1A near the diameter indication. The material which is to be drilled is marked on the lower portion of the upper slide 3 so as to be visible through the aperture 1a in the sheath 1. Finally, the times of drilling in minutes for an advance of 10 mm., when operating the feed manually, are marked on the under side of the slide 2 adjacent its upper portion. The materials to which this time data refers are marked on the under side of sheath 1, the abbreviation being as follows: copper (Co), bronze (B), cast-iron (C), aluminium (A), brass (Br) and steel (St).

The operation of the indicating slide device described above is as follows.

Assuming that a bore is to be drilled in copper by a drill having a diameter of 4 mm., the slide 2 with the knob 5 in released condition is first set so as to read a fixed index, for example, number 2 in the aperture 1A. The slide 3 is then set in a position in which the word "copper" appears in the aperture 1a. The setting knob 5 is then tightened and by operating the same the two united slides 2 and 3 are now displaced in unison until the diameter 4 appears in the aperture 1A. The required number of revolutions of the drilling spindle (5000) may now be read in the aperture 1A beside the indication of the diameter, and on the reverse side of the sheath 1 the time and minutes for a drilling depth of 10 mm.

Obviously, other indicating or calculating problems may be solved in this manner with two or more slides to be displaced each individually or in unison by means of the uniting means described. A very useful and practical application would be its use as a time table or in the computation of railway times to supplant the railway time table now in use.

A modified arrangement for uniting the two slides is shown in Figs. 5 and 6. In this form the necessity of loosening and tightening a setting knob is avoided. In place of a screw bolt a resilient standard 6 protrudes into the slots 3s and 1s and is secured to the under slide 2. The upper end of the standard 6 carries a pin 8 by means of which a clamping piece 7 provided with a vertically upstanding lever 7h is supported. The clamping piece on opposite sides thereof extends beyond the margins of the slot 3s of the slide 3 and is provided with grooves into which protrude the margins of the slot 1s in the sheath 1. The under endface of the clamping piece 7 is slightly curved so as to provide a clamping shoe 7f, the top of which is close to the surface of the slide 2, without however touching the latter. When it is desired to displace the two slides jointly this is accomplished by simply tilting the lever 7h in one direction or the other. Consequently the clamping shoe 7f engages the surface of the slide 3 and presses it into contact with the slide 2 so as to bind the two slides for simultaneous displacement. When released, the lever 7h will return to its initial position due to the resiliency of the standard 6. When it is desired to merely displace only the slide 2, this is accomplished by holding the lever 7h in its normal upstanding position.

A further modification of the uniting means is shown in Fig. 7. A U-shaped bracket is secured to the under slide 2 so as to traverse the slots 1s and 3s and its upper open end protrudes above the upper face of the sheath 1. A clamping member 13 is associated with the bracket, said member having a circular guide groove in to which the margins of the sheath defining the slot 1s project. A transversely extending pivot bar 10 of a clamping eccentric 11 is pivoted to the bracket, and in the position shown the eccentric presses the clamping member 13 against the upper surface of the slide 3 so as to unite the same with the slide 2. An operating handle 12 is secured to the pivot bar 10 and when said handle is oscillated to one side or the other as indicated by the arrows, the clamping eccentric is turned so as to release the clamping member 13 to bring about disengagement of the upper from the under slide.

The indicating slide device embodying the principles of the invention may also be made in a circular shape such as illustrated in Fig. 8. The sheath 1' may constitute two circular discs connected together on a portion of their outer circumferences and carrying in their center a pivot pin C for the slides 2' and 3' also of circular shape. The flap 2'f corresponding to the flap 2f of Fig. 1 takes the form of a circular disc of smaller diameter than the rotatable slide members 2' and 3', said flap 2'f being firmly connected to the associated rotatable disc 2' by a central bushing (not shown in the drawing) whereby the flap rotates in unison with said lower disc 2'. Concentric slots 1's and a slot in the rotatable disc 3' are provided, the former being located in the upper face of the sheath 1'. There are also reading apertures 1'A and 1'a in the sheath 1'. The upper disc 3' is provided with a lug 3'p protruding from the circumference of the sheath whereby said disc may be turned, while the lower rotatable disc 2' may be turned by means of a setting knob 5 which, when tightened, causes the turning in unison of the two discs 2' and 3'. On its outer surface the sheath 1' may be provided with indicia such as graduations indicating a twenty four hour railway timetable.

While the invention has been described in detail it will be appreciated that various changes and modifications may be made as will be apparent to those skilled in the art. It is contemplated to cover all such and to be limited in this respect only as may be necessary by the scope of the claim hereto appended.

What I claim is:

An indicating slide device comprising an elongated sheath formed of united top and bottom faces, said top face having transversely extending openings spaced longitudinally thereof, said top face also having a longitudinally extending slot intermediate its ends and adjacent an edge of said top face, an upper and a lower indicia-bearing member slidably mounted in said sheath, means secured to said lower indicia-bearing member and extending through said slot for moving said lower member longitudinally in said sheath, said means comprising a threaded post fastened to said lower member, a knob threadedly engaging said post, said knob being operable to frictionally clamp said upper and lower members together for moving same in unison, said knob further having a circumferential groove receiving the edges of the sheath which define the longitudinal slot in the upper face thereof.

GEORGE ALVARI.